United States Patent
Zimmerman et al.

(10) Patent No.: US 11,593,793 B2
(45) Date of Patent: Feb. 28, 2023

(54) CRYPTOCURRENCY PAYMENT AND REFUND PROCESSING ON A TRANSACTION TERMINAL

(71) Applicant: NCR Corporation, Atlanta, GA (US)

(72) Inventors: Terry Lee Zimmerman, Dacula, GA (US); Mary B. Ames, Rochester, MN (US); David Stephen Bearden, Cumming, GA (US); Virgilio Nicolas Garcia, Athens, GA (US); William Glynn Rogers, Jr., Grayson, GA (US)

(73) Assignee: NCR Corporation, Atlanta, GA (US)

( * ) Notice: Subject to any disclaimer, the term of this patent is extended or adjusted under 35 U.S.C. 154(b) by 254 days.

(21) Appl. No.: 16/023,195

(22) Filed: Jun. 29, 2018

(65) Prior Publication Data

US 2020/0005283 A1    Jan. 2, 2020

(51) Int. Cl.
| | | |
|---|---|---|
| *G06Q 20/36* | (2012.01) | |
| *G06Q 20/40* | (2012.01) | |
| *G06Q 20/20* | (2012.01) | |
| *G06Q 20/18* | (2012.01) | |
| *G06Q 20/38* | (2012.01) | |
| *G06Q 20/32* | (2012.01) | |
| *G06Q 20/06* | (2012.01) | |

(52) U.S. Cl.
CPC ....... *G06Q 20/3678* (2013.01); *G06Q 20/065* (2013.01); *G06Q 20/18* (2013.01); *G06Q 20/20* (2013.01); *G06Q 20/3276* (2013.01); *G06Q 20/381* (2013.01); *G06Q 20/405* (2013.01); *G06Q 20/407* (2013.01); *G06Q 2220/00* (2013.01)

(58) Field of Classification Search
CPC ...... G06Q 20/20; G06Q 20/407; G06Q 20/30; G06Q 20/36; G06Q 20/367; G06Q 20/3678; G06Q 20/405; G06Q 20/38; G06Q 20/381; G06Q 20/382; G06Q 20/4016
See application file for complete search history.

(56) References Cited

U.S. PATENT DOCUMENTS

| | | | | |
|---|---|---|---|---|
| 6,999,943 B1 * | 2/2006 | Johnson | ......... | G06Q 20/10 705/35 |
| 2005/0096990 A1 * | 5/2005 | Algiene | ......... | G06Q 20/14 705/21 |
| 2008/0103972 A1 * | 5/2008 | Lanc | ......... | G06Q 20/4012 705/44 |
| 2014/0019352 A1 * | 1/2014 | Shrivastava | ......... | G06Q 20/326 705/41 |
| 2014/0052593 A1 * | 2/2014 | Pool | ......... | G06Q 30/0635 705/34 |
| 2015/0178693 A1 * | 6/2015 | Solis | ......... | G06Q 20/12 705/40 |
| 2015/0186892 A1 * | 7/2015 | Zhang | ......... | G06Q 20/326 705/44 |
| 2015/0324789 A1 * | 11/2015 | Dvorak | ......... | G06Q 20/3274 705/67 |

(Continued)

*Primary Examiner* — James D Nigh
*Assistant Examiner* — Jeffrey L Licitra
(74) *Attorney, Agent, or Firm* — Schwegman, Lundberg & Woessner

(57) ABSTRACT

A transaction terminal provides processing for payment using a cryptocurrency during a transaction being conducted at the transaction terminal. The transaction terminal further provides processing for a refund transaction utilizing cryptocurrency.

18 Claims, 4 Drawing Sheets

(56) References Cited

U.S. PATENT DOCUMENTS

| | | | |
|---|---|---|---|
| 2015/0363783 A1* | 12/2015 | Ronca | G06Q 20/382 |
| | | | 705/71 |
| 2016/0012465 A1* | 1/2016 | Sharp | G06Q 20/384 |
| | | | 705/14.17 |
| 2017/0116608 A1* | 4/2017 | Forzley | G06Q 20/4014 |
| 2017/0132630 A1* | 5/2017 | Castinado | G06Q 20/382 |
| 2017/0228727 A1* | 8/2017 | Forzley | G06Q 20/405 |
| 2019/0026705 A1* | 1/2019 | Lee | G06Q 20/065 |
| 2019/0244207 A1* | 8/2019 | Samuel | G06Q 20/405 |
| 2020/0111066 A1* | 4/2020 | Anstey | H04L 67/1044 |
| 2020/0234259 A1* | 7/2020 | Nonaka | G06Q 20/102 |
| 2020/0258152 A1* | 8/2020 | Naggar | G06Q 40/04 |

\* cited by examiner

CRYPTOCURRENCY PAYMENT AND REFUND PROCESSING ON A TRANSACTION TERMINAL

BACKGROUND

Cryptocurrencies are growing in popularity with consumers and even within the investment community. In fact, Exchange Traded Funds (ETFs) are available for investing in Bitcoin. Some retirements plans also support investing in cryptocurrencies. Yet, retailers have been reluctant to move towards acceptance of cryptocurrencies because their existing payment processing, interfaces, and terminals do not support such forms of payment.

There are also risks associated with accepting cryptocurrencies as a form of tender for a transaction. The exchange value of cryptocurrency can fluctuate substantially day over day and even intraday. Furthermore, some cryptocurrencies, such as Bitcoin can take a substantial amount of time until confirmation is provided to the seller (e.g., retailer). Bitcoin can take 15 minutes or more to fully confirm a bitcoin transfer from a buyer's wallet to a seller's wallet.

Still further and even for retailers that have considered or are considering offering cryptocurrencies as a form of tender, there is nothing in the industry whatsoever that is able to provide a refund process to the consumers when the consumers used cryptocurrency as payment for a product and the consumers return a product back to a retailer for a refund. Presumably, such refunds would just be in-store credits to the consumer and not a refund of actual government-backed currency or a refund of the original cryptocurrency used by the consumer for the original product purchase with the retailer.

SUMMARY

In various embodiments, methods and a system for cryptocurrency payment and refund processing on a transaction terminal are presented.

According to an embodiment, a method for cryptocurrency payment and refund processing on a transaction terminal is presented. More particularly, a cryptocurrency payment selection is received during a payment portion of a payment transaction on a transaction terminal. A wallet identifier for a wallet is presented on a payment screen of the transaction terminal responsive to the cryptocurrency payment selection. A cryptographic network is checked with the wallet identifier and a pending transaction identifier for a transfer from a customer wallet to the wallet is obtained from the cryptographic network. A payment for the transaction is confirmed based on the pending transaction identifier. Finally, the pending transaction identifier is provided on a receipt delivered from the transaction terminal to conclude the transaction.

DETAILED DESCRIPTION

Figure 1:
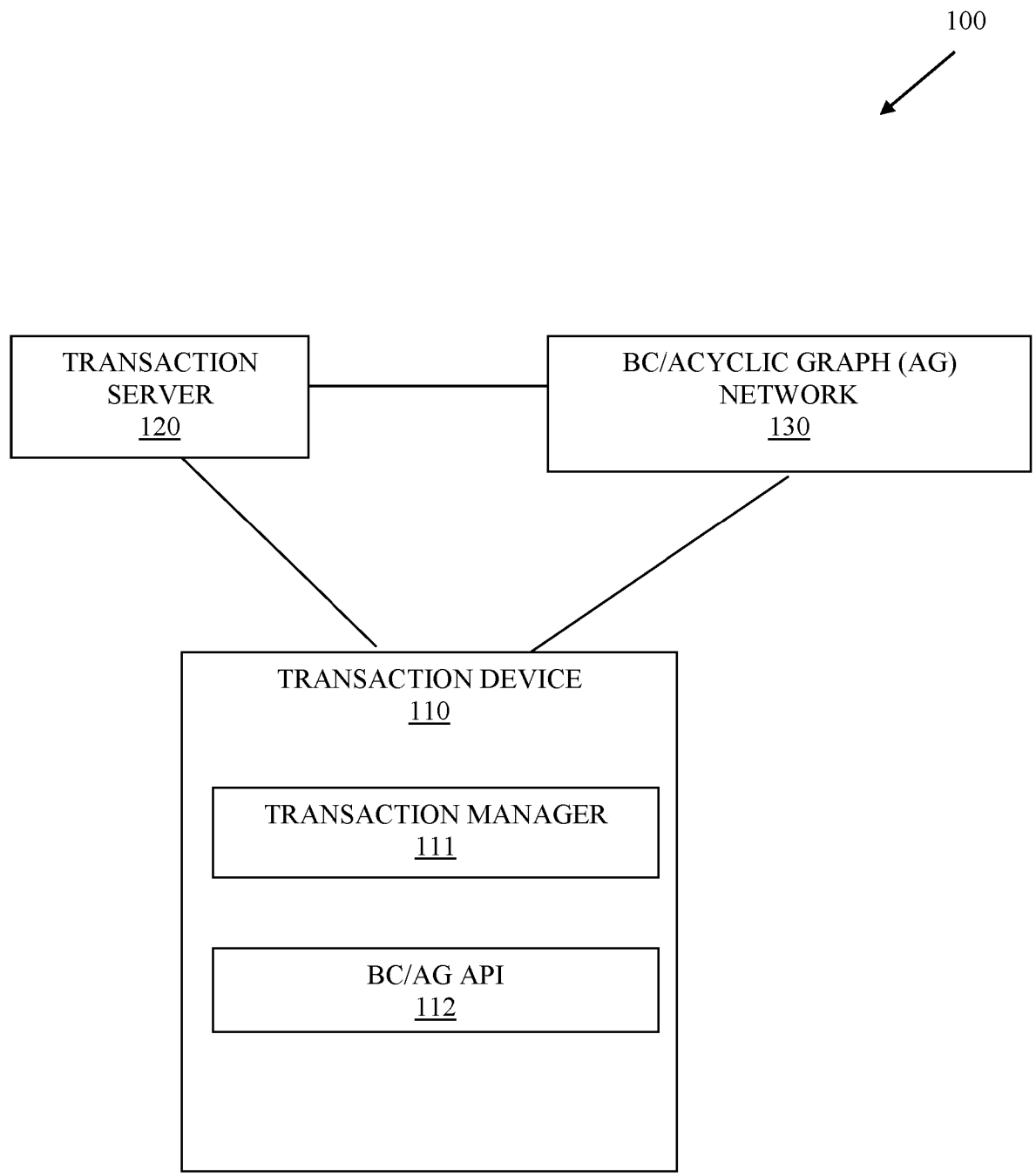
FIG. 1 is a diagram of a system for cryptocurrency payment and refund processing on a transaction terminal, according to an example embodiment.

FIG. 1 is a diagram of a system 100 for cryptocurrency payment and refund processing on a transaction terminal, according to an example embodiment. The various components are illustrated and the arrangement of the components is presented for purposes of illustration only. It is to be noted that other arrangements with more or less components are possible without departing from the cryptocurrency payment and refund processing on a transaction terminal teachings presented herein and below.

The techniques, methods, and system presented herein and below for cryptocurrency payment and refund processing on a transaction terminal can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

Further, "entity" refers to an organization that accepts payment and provides refund services, such as a retailer but can be a non-profit or government organization. Therefore, to the extent that the term "retailer" or "enterprise" is used herein, such term is also intended to include any organization that accepts payment and provides refund services to consumers.

The system 100 includes: transaction device 110, a transaction server 120, and Blockchain (BC) and/or Acyclic Graph (graph) network 130. The transaction device 110 includes a transaction manager 111 and a BC/graph Application Programming Interface (API) 112 (hereinafter just "API 112").

The transaction manager 111 includes a user-facing interface that presents transaction screens and processes user-selections made from such screens for transactions being conducted at the transaction terminal. The transaction manager 111 also includes a server-interface for communication and interaction with the transaction server 120 during a transaction for purposes of performing transaction operations utilizing an enterprise's data assets (loyalty database, item database, enterprise dataset, etc.) and enterprise services (payment card processing interfaces to the data assets, etc.).

The transaction manager 111 drives the processing flow for a transaction for purposes of initiating and completing transactions on the transaction device 110 (may also be referred to herein as a "transaction terminal 110"). As such, the transaction manager 111 communicates with a variety of integrated peripheral devices of the transaction terminal 110, such as and by way of example only, payment/loyalty card reader, receipt printer, currency/check acceptor, currency dispenser, coin acceptor, coin dispenser, touchscreen display, keyboard, scanner, etc.

In an embodiment, the transaction terminal 110 is one of: a Point-Of-Sale (POS) terminal and a Self-Service Terminal (SST). The POS terminal is operated by a cashier of the enterprise on behalf of checking customers out for a transaction. The SST is operated by the customer for selfcheckout of a transaction. In an embodiment, the SST is a kiosk. In an embodiment, the SST is an Automated Teller Machine (ATM).

The processing flow (workflow) of an existing transaction manager is enhanced herein as the new and novel transaction manager 111 for processing cryptocurrency payments and providing cryptocurrency refunds at the transaction terminal 110.

As such, the user-facing interface of the transaction manager 111 includes a presented option on the display of the transaction terminal for conducting payment with cryptocurrency and performing cryptocurrency refund processing. The option presented may indicate that a specific cryptocurrency currency (such as Bitcoin, Ethereum, Litecoin, Iota, etc.) is available as a form of payment processing. The option presented may also include a listing of a plurality of cryptocurrencies supported at the transaction terminal 110 for payment, a particular customer-desired cryptocurrency selectable from the presented listing.

In an embodiment, the availability of the cryptocurrency payment at the transaction terminal 110 is presented within context on the transaction screens that are rendered during a transaction to the transaction display. For example, the availability of the cryptocurrency payment option is presented when the operator of the transaction terminal 110 has completed item entry (manual and/or through scanning) and selects a pay now option from those transaction screens. This changes the context of the transaction, and the transaction manager renders the payment options (including the cryptocurrency payment option) in a payment transaction screen on the transaction terminal's display for operator viewing and operator selection of a particular payment method.

The transaction manager's workflow for a payment method selected that is not cryptocurrency is unaltered and is processed by the transaction manager 111 in a conventional manner.

The workflow of the transaction manager 111 for a payment method that selects a particular cryptocurrency proceeds as follows. The API 112 is called to obtain a current exchange rate for the selected cryptocurrency vis-à-vis the government-backed currency that the transaction terminal 110 is preconfigured to process for payment (such as U.S. dollar, Euro, Canadian dollar, etc.). The API 112 returns the current exchange rate. The transaction manager 111 has the total transaction price for the transaction being processed and calculates an equivalent amount of the selected cryptocurrency that is needed to equal the government-backed currency. In some cases, a fee associated with the cryptocurrency can also be added to the total transaction price before the transaction manager 111 calculates the equivalent amount.

Next, the transaction manager 111 uses the user-facing interface to display the equivalent amount needed to conclude the transaction along with an image of a cryptocurrency wallet that the enterprise has pre-established with a cryptocurrency provider (e.g., Coinbase®, etc.) on the display for viewing by the operator. The wallet is displayed on the display as a Quick-Response (QR) code. Instructions and the amount of the selected cryptocurrency needed to complete the transaction are also displayed on the display with the enterprise (seller) wallet image.

The instructions inform the operator that the buyer (who may also be the operator when the transaction terminal 110 is a SST) should open their cryptocurrency mobile application on their mobile device and take a picture or scan the image of the enterprise's displayed wallet image. The instructions also instruct the buyer after scanning the image to enter into the mobile application's interface the equivalent amount that is needed from completing the transaction at the transaction terminal 110. This causes the mobile application to initiate a BC/graph wallet-to-wallet transfer from the wallet of the buyer to the wallet of the enterprise over the BC/graph network 130.

After a small configured delay period of displaying the instructions, the equivalent amount, and the enterprise's wallet image, the transaction manager 111 processes the API 112 to check on pending transactions being made with respect to the enterprise's wallet identifier (which the transaction manager 111 is preconfigured to have. The pending transactions to the enterprise's wallet will be displayed rapidly (within a few minutes). The pending transaction for the buyer's transfer will also include a transaction identifier. The transaction identifier will not change and will remain consistent while the BC/graph 130 confirms the transfer of the equivalent amount from the buyer's wallet to the enterprise's wallet.

At this point, the transaction manager 111 assumes that the transaction will complete successfully. Essentially, for expediency the enterprise is assuming the risk that the buyer had the equivalent amount of the selected currency to send from the buyer's wallet to the enterprise's wallet. The risk is mitigated because the buyer cannot retract the transfer once it was initiated and assigned a transaction identifier on the BC/graph network 130.

In an embodiment, the transaction manager 111 does not display in the payment screens during processing the transaction any option for payment with cryptocurrencies when the total transaction price exceeds an enterprise-defined amount. In an embodiment, the enterprise-defined amount is greater than $20 (U.S. dollars). This permits the enterprise to control the level of risk in accepting cryptocurrency as a form of payment. After a period of time, the enterprise may increase or decrease the enterprise-defined amount based on actual losses experienced by the retailer in transaction histories associated with cryptocurrency payments.

Once, the transaction manager 111 has the BC/graph transaction identifier for the BC/graph wallet to wallet transfer from the BC/graph network 130 (again a few minutes at most sometimes sooner), the transaction manager 111 prints a receipt for the transaction being conducted at the transaction terminal 110. The receipt includes a transaction identifier for the transaction that is recognized by the transaction server 120 of the enterprise, the BC/graph wallet to wallet transaction identifier provided from the BC/graph network, and other typical transaction details.

In an embodiment, the BC/graph transaction identifier is printed on the receipt as Quick-Response (QR) code, which can be processed automatically by the transaction manager 111 during any return of the buyer of any or all of the items that were purchased by the buyer during the transaction at the transaction terminal 110.

Because the BC/graph transaction identifier is unique (quite large in size to ensure uniqueness), the transaction server 120 and/or the transaction manager 111 (through the API 112) can use the BC/graph identifier to query BC/graph 130 and confirm that the actual equivalent amount of the selected cryptocurrency was transferred from the buyer's wallet to the enterprise's wallet and match that BC/graph identifier in the transaction history for the enterprise to the transaction server assigned transaction identifier for the buyer's original transaction.

In an embodiment, either the transaction manager 111 or a server-based process of server 120 periodically checks using the BC/graph transaction identifier with the BC/graph 130 until confirmation or denial of the wallet-to-wallet transfer is available. This can be done every 10 minutes following the transaction, every 15 minutes, every hour, and/or once a day at a designated time. Furthermore, this can be done for all cryptocurrency payments processed by the enterprise that are not confirmed or denied by the BC/graph 130 during any period of checking. Once confirmation or denial is achieved, the transaction records for the enterprise are updated in the transaction history for the specific enterprise-assigned transaction identifier.

Any denials can be flagged and sent to other enterprise server-services on the enterprise server 120 that tracks a total number of cryptocurrency transactions along with the denial/failure rate and success rate. These rates can be used to automatically lower or raise the maximum amount of cryptocurrency relative to a government-backed value that the enterprise is willing to accept as a risk without actually having confirmations of cryptocurrency transfers from the BC/graph 130 at a time of transactions at the transaction terminal 110.

In an embodiment, an enterprise service on the enterprise server 120 can also send a command to the transaction manager 111 to suspend all cryptocurrency transactions at the terminal 110. That is, such an enterprise service can monitor the exchange rates of the cryptocurrency in view of a preconfigured threshold to discover a trend either upward in value and/or downward in value indicating that cryptocurrency may becoming unstable and presents too great of risk for the enterprise to continue to accept as tender until the rates stabilize over a given period of time. In this way, the enterprise can also control risks associated with accepting cryptocurrency as a form of payment dynamically and in real time so as to limit loss associated with such payments.

As stated above, the transaction manager 111 also supports refund processing. During a refund workflow, the operator of the transaction terminal 110 selects a refund transaction through the transaction screens presented by the transaction manager 111. An option is presented by the transaction manager 111 for cryptocurrency refund. The operator provides the BC/graph transaction identifier through the transaction screens and the enterprise-provided transaction identifier for the original transaction. This information is provided on the customer-presented receipt. In an embodiment, the BC/graph transaction identifier is scanned as a QR code from the receipt. The transaction manager 111 interacts with enterprise services to locate the specific transaction in the transaction history and the details for that transaction. Next, the transaction manager 111 uses the API 112 to access the BC/graph with the BC/graph transaction identifier to identify whether the amount of cryptocurrency was transferred from the buyer's wallet to the enterprise wallet. Note, that in some embodiments such confirmation may already be discoverable from the transaction history of the enterprise, such as in the above-noted embodiment where some notation is made in the transaction history that payment was confirmed (can be a single character field such as C or F (for confirmed or failed)). The transaction manager 111 uses the API 112 to obtain a current exchange rate between a government-backed currency and the cryptocurrency. The transaction manager 111 then calculates a refund equivalency amount from a government-backed currency to the cryptocurrency value based on the current exchange rate and the refund amount that is to be refunded to the customer requesting the refund. The buyer is then asked to open a cryptocurrency wallet mobile application and display an image of the customer's cryptocurrency wallet on a display of the customer's mobile device. The customer is asked to place the image under a scanner of the terminal 110 of the scanner may be handheld and operated to move to the location of the mobile display for the scan. The transaction manager 111 receives the image and interacts with a wallet application accessible to the transaction manager 111 and/or the server 120. The wallet application includes the enterprises wallet. Either the transaction manager 111 asks (through transaction screens) for the operator of the transaction terminal 110 to enter a displayed amount (reflecting the refund amount) or an different API is used automatically by the transaction manager 111 to automatically supply the amount to the wallet application, and the wallet application accessible to the transaction terminal 110 initiates a transfer of the amount from the wallet of the enterprise to the wallet of the consumer over the BC/graph 130. After a few minutes, the transaction manager 111 obtains using the API 112 from the BC/graph 130 a BC/graph transaction identifier for the enterprise wallet to customer wallet transaction. The transaction manager 111 causes the printer to print a revised receipt reflecting the refund at the transaction terminal 110 which may include the BC/graph transaction identifier. The transaction manager 111 communicates the refund details to a server service on the server 120 to be reflected in the transaction history for the original purchase transaction for purposes of including the refund transaction.

Note that a customer may believe they should receive the same amount of cryptocurrency back in a refund as what they paid when the purchased the items associated with the refund. However, the value of the cryptocurrency may have went up in value since the original purchase. Thus, the enterprise may clearly state a policy that the refund amount is based on the government-backed currency and based on the current value of the cryptocurrency at the time of purchase and the time of refund. Such policy may be presented at the time of the original payment of the item in the payment screens by the transaction manager 111. As long as the policy is clearly communicated, the customer should be okay with receiving less cryptocurrency back then what the original customer provided for the original purchase because the customer should be aware that the value of the cryptocurrency has increased in value. Plus, this benefits the customer because if the cryptocurrency goes down in value from the time of original purchase to the time of the refund, under such a policy the customer will receive more cryptocurrency then what was originally provided by the customer.

In an embodiment, and for purchase transactions using cryptocurrency, the transaction manager 111 can dynamically create for a transaction a new enterprise cryptocurrency wallet using a wallet based application associated with the enterprise and accessible on the transaction terminal 110 or accessible to the transaction manager 111 over a network connection to the enterprise server 120. Each wallet can be labeled within the wallet application with the enterprise-specific transaction identifier. In this way for purchase transactions, the enterprise maintains a 1-1 wallet to enterprise transaction relationship. An API to the wallet application of a wallet provider may further provide automated queries for wallet labels that include the unique enterprise-specific transaction identifier. This can be used for confirming wallet-to-wallet transactions without directly accessing the BC/graph 130 since such information is obtained from the wallet provided for any given wallet. This may also be used for other automated processing that the enterprise may desire.

In an embodiment, when the customer identifier is obtained through a loyalty card with the transaction, the customer identifier can be linked to the specific transactions that pay using cryptocurrency. Such information may be useful to the enterprise in a variety of manners, for example offering customized promotions that utilize the customer's preferred cryptocurrency, suspending a customer's availability to pay using cryptocurrency because of failed transactions, requesting payment for failed transactions, identifying customer segmentation based on cryptocurrency usage, applying customer-available promotions to transactions at the transaction terminal 110, custom displaying customer profile payment methods during a customer transaction at the transaction terminal and including the cryptocurrency payment option along with other payment options in a single payment screen for selection by the customer during the transaction, recording if approved a customer-registered cryptocurrency wallet identifier such that the customer does not have to provide the customer's wallet during any refund transaction associated with the customer, recording loyalty points for transactions at the transaction terminal 110, and other situations.

In an embodiment, the customer remains completely anonymous to the enterprise for the transaction at the transaction terminal 110.

These and other embodiments are now discussed with reference to the FIGS. 2-4.

Figure 2:
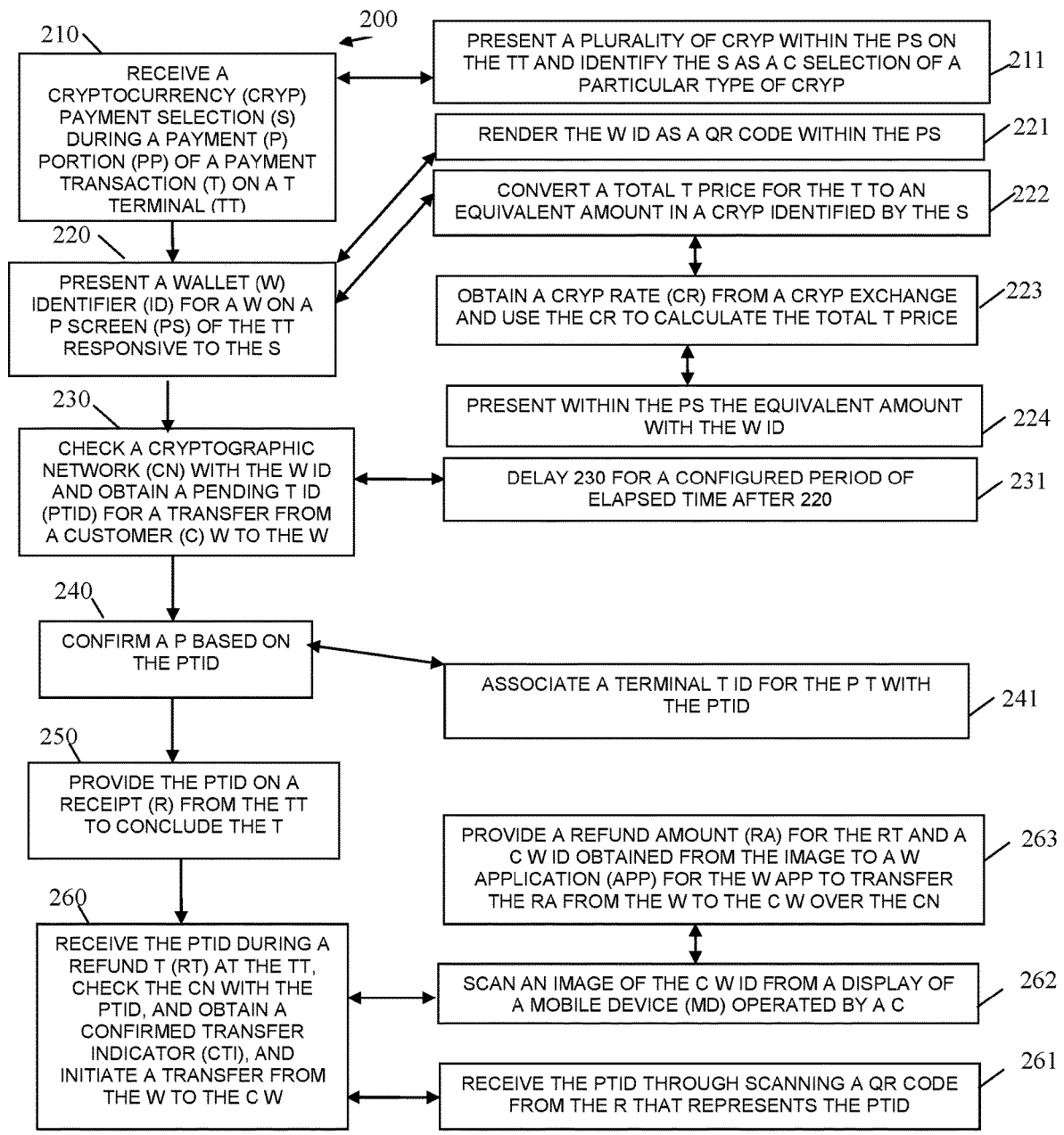
FIG. 2 is a diagram of a method for cryptocurrency payment and refund processing on a transaction terminal, according to an example embodiment.

FIG. 2 is a diagram of a method for cryptocurrency payment and refund processing on a transaction terminal, according to an example embodiment. The software module(s) that implements the method 200 is referred to as a "transaction terminal transaction manager." The product tracer is implemented as executable instructions programmed and residing within memory and/or a non-transitory computer-readable (processor-readable) storage medium and executed by one or more processors of a device. The processor(s) of the device that executes the transaction terminal transaction manager are specifically configured and programmed to process the transaction terminal transaction manager. The transaction terminal transaction manager has access to one or more networks during its processing. The networks can be wired, wireless, or a combination of wired and wireless.

In an embodiment, the transaction terminal transaction manager is all or some combination of the modules 111 and 112.

In an embodiment, the device that executes the product tracer is the transaction device 110. In an embodiment, the transaction device 110 is one of: a SST, a POS terminal, a kiosk, and an ATM.

At 210, the transaction terminal transaction manager receives a cryptocurrency payment selection during a payment portion of a payment transaction on a transaction terminal. The user-facing interface for transactions at the transaction terminal enhanced to provide options to pay using the cryptocurrency as discussed above with the FIG. 1. In an embodiment, the cryptocurrency payment option is unavailable and concealed by the transaction terminal when transactions exceed a predefined threshold amount as their total transaction prices. This allows a customized level of risk that is associated with cryptocurrency transactions to be set by an enterprise associated with the transaction terminal.

In an embodiment, at 211, the transaction terminal transaction manager presents a plurality of cryptocurrencies within the payment screen (discussed at 220 below) on the transaction terminal's display. The transaction terminal transaction manager identifies the cryptocurrency payment selection as a selection of a particular type of cryptocurrency. That is, the transaction terminal transaction manager supports multiple different cryptocurrency payment processing, such as but not limited to: Bitcoin, Ethereum, IOTA, etc.

At 220, the transaction terminal transaction manager presents a wallet identifier for a wallet on a payment screen of the transaction terminal responsive to receiving the cryptocurrency payment selection at 210. The wallet is accessible through a wallet application provided by a cryptocurrency provider.

In an embodiment, at 221, the transaction terminal transaction manager renders the wallet identifier as a QR code within the payment screen and on the transaction terminal's display. The display of the transaction terminal may be a customer-facing display when the transaction terminal is being operated as a POS terminal by a cashier.

In an embodiment, at 222, the transaction terminal transaction manager converts a total price for the payment transaction to an equivalent amount of a cryptocurrency identified by the cryptocurrency payment selection at 210.

In an embodiment of 222 and at 223, the transaction terminal transaction manager dynamically and in real time obtains a cryptocurrency rate from a cryptocurrency exchange and uses the cryptocurrency rate to calculate the total price.

In an embodiment of 223 and at 224, the transaction terminal transaction manager presents within the payment screen the equivalent amount with the wallet identifier. Specific customer instructions on how to initiate the cryptocurrency payment for the total transaction price may also be rendered on the transaction terminal's display within the payment screen.

At 230, the transaction terminal transaction manager checks a cryptographic network with the wallet identifier and obtains a pending transaction identifier for a transfer from a customer wallet of a customer to the wallet held by the enterprise associated with the transaction terminal.

In an embodiment, at 231, the transaction terminal transaction manager delays the processing at 230 for a configured period of elapsed time after the processing at 220. That is, it may take a minute or two after the customer initiates the cryptocurrency payment from the customer's wallet to be noted by the cryptographic network (blockchain or acyclic graph), so a configured delay in processing 230 will allow the customer time to initiate the transfer before the transaction terminal transaction manager denies payment for the transaction.

At 240, the transaction terminal transaction manager confirms a payment for the payment transaction based on successfully obtaining the pending transaction identifier at 230.

In an embodiment, at 241, the transaction terminal transaction manager associates a terminal transaction identifier for the payment transaction with the pending transaction identifier obtained from the cryptographic network.

In an embodiment, at 250, the transaction terminal transaction manager provides the pending transaction identifier on a receipt from the transaction terminal to conclude the transaction. The receipt can be printed from a receipt printer of the transaction terminal. In an embodiment, the receipt is emailed to a customer-registered email address (assuming the customer provides such an email during the payment transaction or assuming an identity for the customer is obtained from a loyalty account provided by the customer during the payment transaction and the email address is registered in the customer loyalty account record).

In an embodiment of 250 and at 260, the transaction terminal transaction manager receives the pending transaction identifier during a refund transaction at the transaction terminal. The transaction terminal transaction manager checks the cryptographic network with the pending transaction identifier and obtains a confirmation or confirmed transfer indicator from the cryptographic network. The transaction terminal transaction manager then initiates a transfer of cryptocurrency from the wallet of the enterprise to the customer's wallet.

In an embodiment of 260 and at 261, the transaction terminal transaction manager receive the pending transaction identifier through scanning a QR code from the receipt, the QR code represents the pending transaction identifier.

In an embodiment of at 262, the transaction terminal transaction manager scans an image of the customer wallet from a display of a mobile device operated by the customer.

In an embodiment of 262 and at 263, the transaction terminal transaction manager provides a refund amount for the refund transaction and a customer wallet identifier obtained from the image to a wallet application for the wallet application to transfer the refund amount from the wallet of the enterprise to the customer wallet over the cryptographic network.

Figure 3:
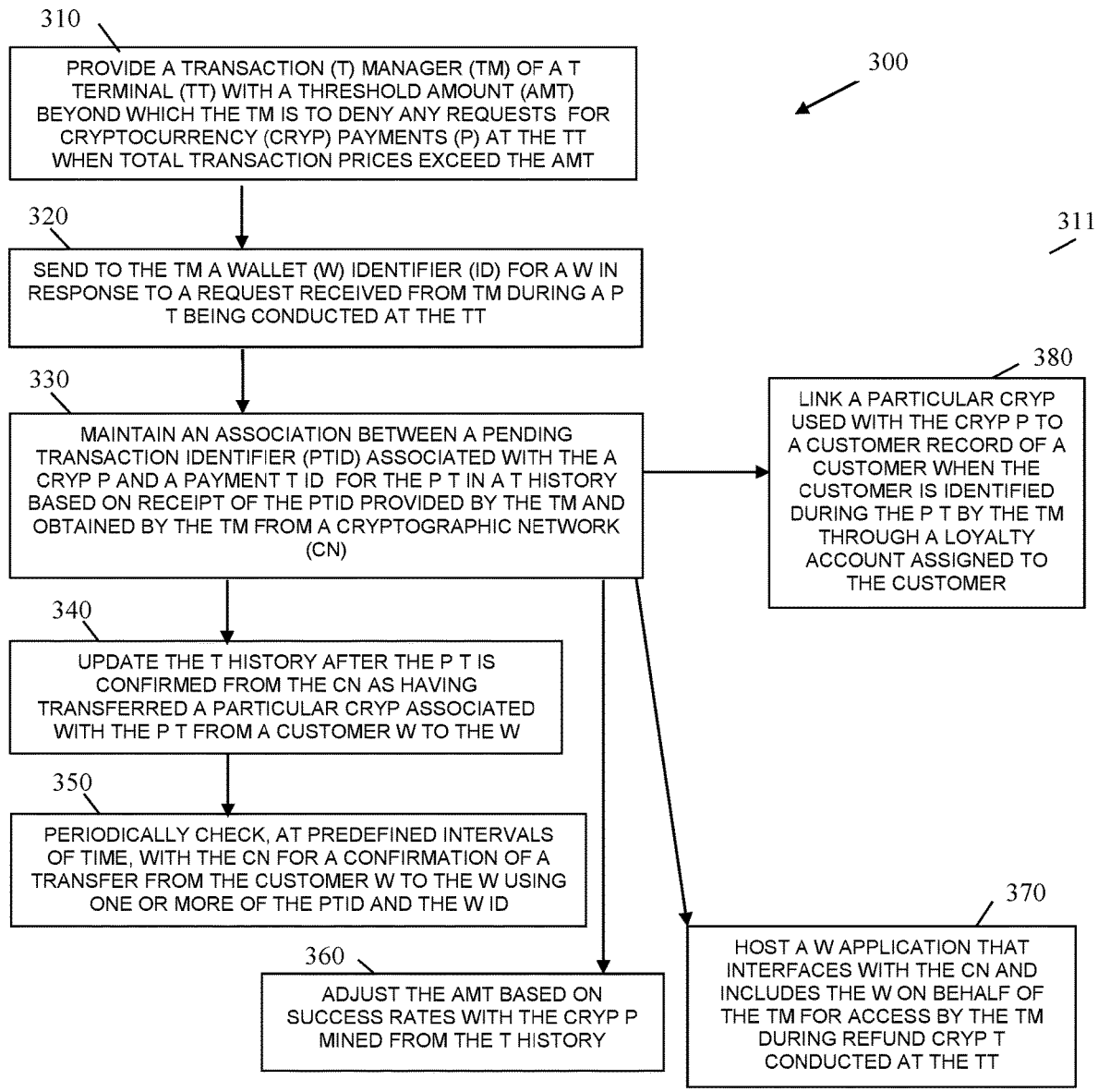
FIG. 3 is a diagram of another method for cryptocurrency payment and refund processing on a transaction terminal, according to an example embodiment.

FIG. 3 is a diagram of another method for cryptocurrency payment and refund processing on a transaction terminal, according to an example embodiment. The software module(s) that implement the method 300 is referred to herein as a "transaction-server transaction manager." The transaction-server transaction manager is implemented as executable instructions and programmed within memory and/or a non-transitory computer-readable (processor-readable) storage medium that executes on one or more processors of a device. The processors of the device are specifically configured to execute the transaction-server transaction manager. The transaction-server transaction manager has access one or more networks; the networks can be wired, wireless, or a combination of wired and wireless.

In an embodiment, the device that executes the transaction-server transaction manager is transaction server 120.

In an embodiment, the device that executes the transaction-server transaction manager is a cloud-based server (cloud).

In an embodiment, the transaction-server transaction manager performs the processing described above in the FIG. 1 for the server-based services of the transaction server 120.

The transaction-server transaction manager interacts and communicates with the transaction manager 111 and/or the method 200 over a network connection during a transaction at the transaction terminal. In an embodiment, the transaction terminal is the transaction terminal 110.

At 310, the transaction-server transaction manager provides a transaction manager (such as transaction manager 111 and/or the method 200) of a transaction terminal (such as transaction terminal 110) with a threshold amount beyond which the transaction manager is to deny any requests for cryptocurrency payments at the transaction terminal when total transaction prices exceed the threshold amount.

At 320, the transaction-server transaction manager sends to the transaction manager a wallet identifier for a wallet in response to a request received from the transaction terminal during a payment transaction being conducted at the transaction terminal with a customer of the enterprise.

At 330, the transaction-server transaction manager maintains an association or linkage between a pending transaction identifier associate with a cryptocurrency payment and a payment transaction identifier in a transaction history based on receipt of the pending transaction identifier provided by the transaction manager and obtained by the transaction manager from a cryptographic network.

In an embodiment, at 340, the transaction-server transaction manager updates the transaction history after the payment transaction is confirmed from the cryptographic network as having transferred a particular cryptocurrency associated with the payment transaction from a customer wallet to the wallet of the enterprise.

In an embodiment of 340 and at 350, the transaction-server transaction manager periodically checks, at pre-defined intervals of time, with the cryptographic network for a confirmation of a transfer from the customer wallet to the wallet using one or more of the pending transaction identifier and the wallet identifier.

In an embodiment, at 360, the transaction-server transaction manager dynamically adjusts the threshold amount based on success rates with the cryptocurrency payments mined from the transaction history. Adjustments can also be made based on the volatility of the cryptocurrency's exchange rates as discussed above.

In an embodiment, at 370, the transaction-server transaction manager hosts a wallet application that interfaces with the cryptographic network and includes the wallet on behalf of the transaction manager for access by the transaction manager during refund cryptocurrency transactions being conducted at the transaction terminal by the transaction manager.

In an embodiment, at 380, the transaction-server transaction manager links a particular cryptocurrency used with the cryptocurrency payment to a customer record of a customer when the customer is identified during the payment transaction by the transaction manager through a loyalty account assigned to the customer by the enterprise.

Figure 4:
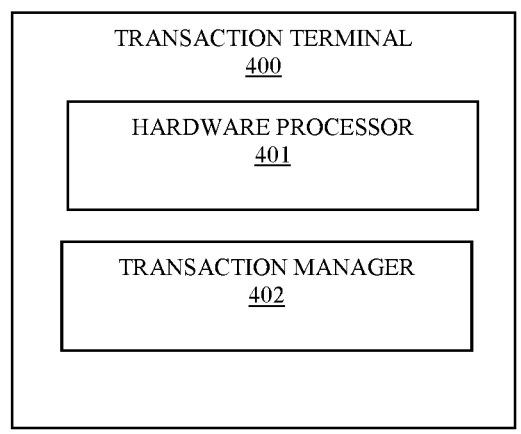
FIG. 4 is a diagram of transaction terminal for cryptocurrency payment and refund processing on a transaction terminal, according to an example embodiment.

FIG. 4 is a diagram of transaction terminal 400 for cryptocurrency payment and refund processing on a transaction terminal, according to an example embodiment. The components of the transaction terminal 400 are programmed and reside within memory and/or a non-transitory computer-readable medium and execute on one or more processors of the devices of the transaction terminal 400. The transaction terminal 400 also has access and can communicate over one or more networks; and the networks can be wired, wireless, or a combination of wired and wireless.

The transaction terminal 400 is configured and programmed to perform the processing discussed above with the FIGS. 1-2. The system 400 is further configured to interact and communicate with the processing described above for the enterprise services of the transaction server 120 and/or the method 300 during transactions at the transaction terminal 400.

The transaction terminal 400 includes at least one hardware processor 401 and a transaction manager 402.

In an embodiment, the transaction terminal 400 is one of: a POS terminal, a SST, a kiosk, and an ATM.

The at least one hardware processor 401 is configured to execute executable instructions residing in a non-transitory computer-readable medium of the transaction terminal 400. The executable instructions represented as the transaction manager 402.

In an embodiment, the transaction manager 402 is all or some combination of: the transaction manager 111, the AP 112, and/or the method 200.

The transaction manager 402 is configured to: i) execute on the hardware processor 401, ii) accept cryptocurrency payments as a form of payment for transactions at the transaction terminal 400, and iii) refund cryptocurrency for refund transactions at the transaction terminal 400 when those refund transactions were originally conducted as the transactions by the transaction terminal 400 using the cryptocurrency as the form of payment.

It is to be noted that although the various descriptions described situations in which a customer was making a purchase at a transaction terminal 110 and/or 400 using a single type of cryptocurrency as a form of payment for a transaction, other embodiments of the invention permit the customer for a single transaction to use multiple different cryptocurrencies (different types of cryptocurrency) for obtaining the total transaction price to pay for the single transaction. In such embodiments, the appropriate processing is iterated to use multiple different wallets for the enterprise (one for each type of cryptocurrency). The customer in such situations would need to open within his wallet application a customer wallet that is unique to each type of cryptocurrency or open different wallet applications (one for each type of cryptocurrency). In such situations, the refund processing may permit refund to a single cryptocurrency or to the multiple cryptocurrencies (based on customer instructions).

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    providing executable instructions to a hardware processor on a transaction terminal from a non-transitory computer-readable storage medium causing the hardware processor to perform operations comprising:
        identifying, a pay now option selected by an operator of the transaction terminal from transaction screens and rendered by a user-facing interface on a transaction display of the transaction terminal during a payment transaction being processed on the transaction terminal;
        rendering, on the transaction display, payment options comprising a cryptocurrency payment option in a payment transaction screen using the user-facing interface;
        receiving, from the user-facing interface, a cryptocurrency payment selection selected by the operator for the cryptocurrency payment option from the payment transaction screen;
        presenting a wallet identifier for a wallet on the payment screen of the transaction terminal responsive to the cryptocurrency payment selection, wherein presenting further includes, rendering, using the user-facing interface, a wallet image representing the wallet identifier within the payment screen during the payment portion of the payment transaction on the transaction terminal;
        checking a cryptographic network to identify or to verify the presence of the wallet identifier and obtaining a pending transaction identifier for a transfer from a customer wallet to the wallet, wherein checking further includes processing an Application Programming Interface (API) for communicating with the cryptographic network and providing the wallet identifier to identify or to verify the presence of the wallet identifier;
        confirming a payment based on the pending transaction identifier;
        providing the pending transaction identifier on a receipt from the transaction terminal to conclude the transaction;
        suspending use of the cryptocurrency selection option within the payment transaction screen of the user interface based on receiving a command from an enterprise server based on the enterprise server determining a risk associated with subsequently requesting the cryptocurrency payment selection for the subsequent transactions on the transaction terminal;
        reinstating use of the cryptocurrency selection option within the payment transaction screen of the user interface based on receiving a second command from the enterprise service indicating that a current risk is acceptable to permit processing of the cryptocurrency payment selection on further transactions on the transaction terminal; and
        processing an existing workflow associated with payment processing when any given transaction at the transaction terminal does not use the cryptocurrency payment selection provided within the payment option screen of the user-facing interface for the corresponding given transaction.

2. The method of claim 1 further comprising, receiving the pending transaction identifier during a refund transaction at the transaction terminal, checking the cryptographic network with the pending transaction identifier, obtaining a confirmed transfer indicator, and initiating a transfer from the wallet to the customer wallet over the cryptographic network.

3. The method of claim 2, wherein receiving the pending transaction identifier further includes receiving the pending transaction identifier through scanning a Quick-Response (QR) code from the receipt that represents the pending transaction identifier.

4. The method of claim 2, wherein initiating further includes scanning an image of the customer wallet from a display of a mobile device operated by a customer.

5. The method of claim 4, wherein scanning further includes providing a refund amount for the refund transaction and a customer wallet identifier obtained from the image to a wallet application that hosts the wallet for the wallet application to transfer the refund amount from the wallet to the customer wallet over the cryptographic network.

6. The method of claim 1, wherein receiving the cryptocurrency payment option further includes presenting a plurality of available cryptocurrencies within the payment screen on the transaction terminal and identifying the cryptocurrency payment selection as a customer selection of a particular type of cryptocurrency.

7. The method of claim 1, wherein presenting further includes rendering the wallet identifier as a Quick-Response (QR) code within the payment screen.

8. The method of claim 1, wherein presenting further includes converting a total transaction price for the transaction to an equivalent amount in a cryptocurrency identified by the cryptocurrency payment selection.

9. The method of claim 8, wherein converting further includes obtaining a cryptocurrency rate from a cryptocurrency exchange and using the cryptocurrency rate to calculate the total transaction price.

10. The method of claim 9, wherein obtaining further includes presenting within the payment screen the equivalent amount with the wallet identifier.

11. The method of claim 1, wherein checking further includes delaying the checking for a configured period of elapsed time after the presenting.

12. The method of claim 1, wherein confirming further includes associating a terminal transaction identifier for the payment transaction with the pending transaction identifier.

13. A method, comprising:
providing executable instructions to a hardware processor on a server from a non-transitory computer-readable storage medium causing the hardware processor to perform operations comprising:
providing a transaction manager executing on a transaction terminal with a threshold amount beyond which the transaction manager is to deny any requests for cryptocurrency payments selected as payment for transactions being conducted at the transaction terminal when a total transaction price for any given one of the transactions at the transaction terminal exceeds the threshold amount;
sending to the transaction manager a wallet identifier for a wallet associated with a particular cryptocurrency in response to a request received from the transaction manager during a payment transaction being conducted at the transaction terminal, wherein the payment transaction is one of the transactions processed at the transaction terminal;
maintaining an association between a pending transaction identifier associated with a given cryptocurrency payment and a payment transaction identifier for the payment transaction in a transaction history based on receipt of the pending transaction identifier provided by the transaction manager and obtained by the transaction manager from a cryptographic network;
monitoring exchange rates published by the cryptographic network by processing an Application Programming Interface (API) for communications with the cryptographic network;
suspending all subsequent cryptocurrency payments for subsequent transactions processed by the transaction manager by sending a command to the transaction terminal based on identifying a trend either upward or downward in the exchange rates in view of a preconfigured threshold, the command causing the transaction manager to suspend a cryptocurrency payment option on the transaction terminal for transaction payments based on processing the command by eliminating the cryptocurrency payment option from a payment transaction screen of a user interface of the transaction terminal;
sending a subsequent command to the transaction terminal to reinstate the cryptocurrency payment option from the payment transaction screen of the user interface based on determining that a current risk is acceptable for permitting the cryptocurrency payment option for further transactions on the transaction terminal;
updating the threshold amount with the transaction manager based on a denial rate for processing the transactions on the transaction terminal, wherein the denial rate comprises a total number of cryptocurrency transactions relative to a total number of denied cryptocurrency payments for the cryptocurrency transactions; and
identifying when a customer identifier for a given customer is determined to be associated with a loyalty account that identifies a failed transaction and suspending the given customer's ability to pay with cryptocurrency for a given transaction and requesting that the transaction manager request payment for the failed transaction.

14. The method of claim 13 further comprising, updating the transaction history after the payment transaction is confirmed from the cryptographic network as having transferred a particular cryptocurrency associated with the payment transaction from a customer wallet to the wallet.

15. The method of claim 14, wherein updating further includes periodically checking, at predefined intervals of time, with the cryptographic network for a confirmation of a transfer from the customer wallet to the wallet using one or more of the pending transaction identifier and the wallet identifier.

16. The method of claim 13 further comprising, adjusting the threshold amount based on success rates with the cryptocurrency payments mined from the transaction history.

17. The method of claim 13 further comprising, hosting a wallet application that interfaces with the cryptographic network and includes the wallet on behalf of the transaction manager for access by the transaction manager during refund cryptocurrency transactions conducted at the transaction terminal.

18. The method of claim 13 further comprising, linking a particular cryptocurrency used with the given cryptocurrency payment to a customer record of a customer when the customer is identified during the cryptocurrency payment by the transaction manager through a loyalty account assigned to the customer.

* * * * *